INVENTOR
Richard O. Peck
BY McCoy, Greene, Medert
& TeGrotenhuis
ATTORNEYS

Sept. 5, 1967  R. O. PECK  3,339,239
INJECTION MOLDING APPARATUS WITH DIAPHRAGM VALVE
Filed April 30, 1965  2 Sheets-Sheet 2

INVENTOR
Richard O. Peck
BY McCoy, Greene, Medest
& Te Grotenhuis
ATTORNEYS

United States Patent Office 3,339,239
Patented Sept. 5, 1967

3,339,239
INJECTION MOLDING APPARATUS WITH DIAPHRAGM VALVE
Richard O. Peck, Tallmadge, Ohio, assignor to The General Tire & Rubber Company, Akron, Ohio, a corporation of Ohio
Filed Apr. 30, 1965, Ser. No. 452,202
7 Claims. (Cl. 18—30)

This invention relates to injection molding equipment and in particular to a molding unit which produces flashless molded parts with a minimum of scrap and which substantially eliminates air pockets which might otherwise be present in the finished product.

The invention is particularly applicable to multiple cavity molding units for molding and curing liquid plastics, such as urethane, for small and medium size parts requiring high production rates and low manufacturing costs. The molding unit of the invention provides a flexible diaphragm preferably formed of "Teflon" (a fluorocarbon resin sold by E. I. du Pont de Nemours and Co.) or other low adhesion plastic, which is mounted in a central chamber located between the injection sprue and the runners to the mold cavities. The diaphragm which normally rests on the chamber floor cooperates with a check valve piston which may be moved perpendicularly against the diaphragm to force the surface thereof into sealing engagement with the mold sprue after the injection of the molding liquid has been completed. With the mold sprue thus sealed by the check valve, the diaphragm may be flexed or expanded further into the central chamber by fluid pressure of greater magnitude than the injection pressure. This causes increased pressure on the molding material, thus assuring complete filling of the mold cavities, reducing the volume of air pockets, causing dissolution of some air into the molding material and also forcing air out of the mold cavity through parting line through which the molding liquid cannot pass. Normally, the pressure used to operate the diaphragm is considerably greater than the injection pressure, such as around 75 p.s.i.

While flashless molding is well known in the art, the flashless molding equipment presently in use makes no provision for the reduction or elimination of air pockets which are a serious problem in the injection molding of liquid plastics. Often, the presence of air pockets will result in the rejection of a substantial percentage of the completed molded parts which increases the overall cost of manufacture. The problem of air pockets is particularly prevalent in the case of liquid urethane injection molding, as is the problem of cleaning the mold after stripping in preparation for the next molding operation. Accordingly, it is particularly desirable to pressurize the liquid urethane within the molding cavity before it cures in order to reduce the air pockets which may be present. Normally, pressurization systems, which use pistons to provide pressure during curing, require extensive cleaning after each molding cycle because the urethane cures to a solid at the base of the piston and must be removed in a separate operation.

With the molding unit of the present invention, the only scrap material that need be removed is small slugs of cured urethane in the sprue and in the runners leading from the central chamber to each molding cavity. These slugs can easily be removed after the mold has been opened for removal of the molded parts. The runner slugs come out along with the molded parts, and the sprue slugs may be removed by a blast of air during the normal air blast cleaning of the mold.

It is among the objects of the invention to provide a molding unit for the injection molding of liquid plastic materials which provides for the reduction and elimination of air pockets and which substantially reduces the scrap to be separated from the mold after the molding cycle.

Another object of the present invention is to provide a molding unit suitable for injection molding with liquid urethane to form small and medium size plastic parts which minimizes the problem of air pockets in the completed molded article and which permits high production rates and low manufacturing costs.

Other objects, uses and advantages will be apparent from the following detailed description and drawings wherein like parts are identified by like numerals and wherein.

Figure 1:
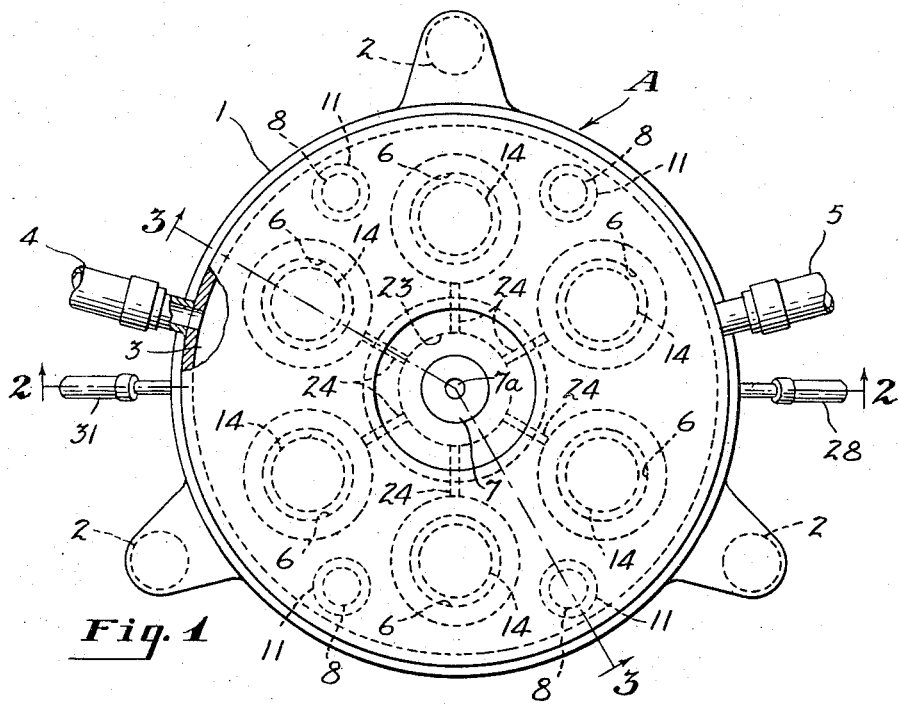
FIGURE 1 is a top plan view of a six-cavity injection molding unit embodying the invention.

Referring more particularly to the drawing, there is shown a six-cavity injection molding unit A embodying the present invention which is designed to mold and cure cylindrical urethane bushings. The molding unit A is adapted for engagement by an injection nozzle B, shown in dashed lines in FIGURE 2 and in solid lines in FIGURE 3, which injects liquid urethane under pressure into the mold sprue.

Figure 2:
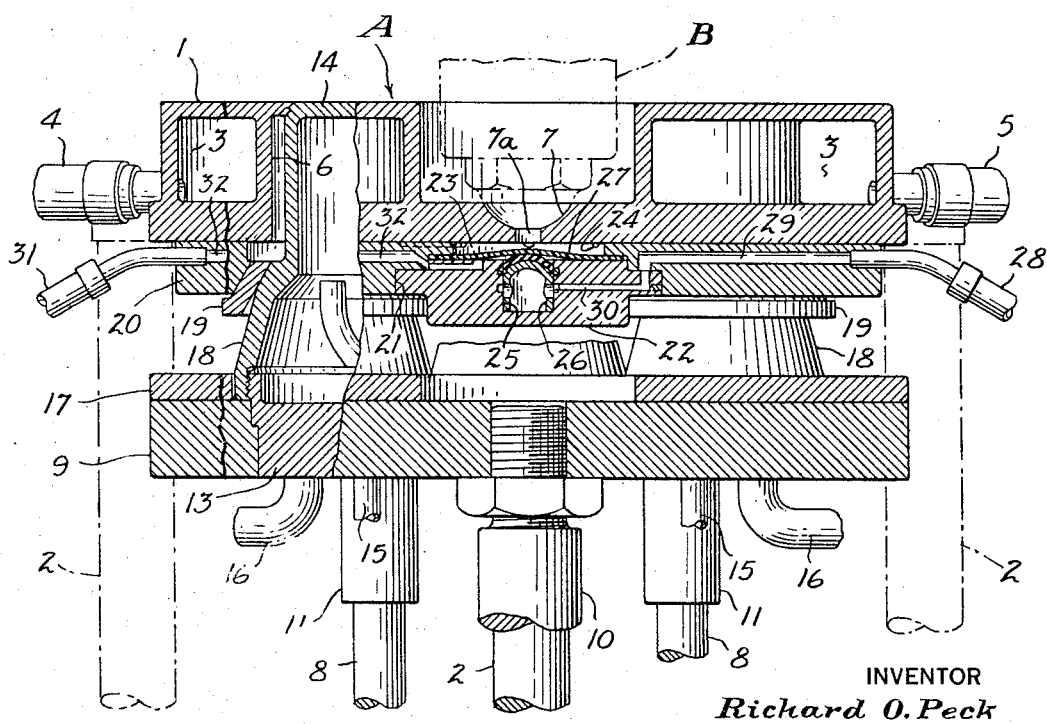
FIGURE 2 is a vertical cross-sectional view taken on the line 2—2 of FIGURE 1 with parts broken away to show an individual mold cavity and its associated core members.

The molding unit A includes a packeted cavity plate 1 mounted on three support posts 2, as shown in FIGURES 1 and 2. The jacketed cavity plate 1 has sealed passages 3 therein which provide for the passage of steam or cooling water through the unit for heating the mold to curing temperatures and for cooling the mold before removal of molded articles. The steam or cooling water is passed through the passages 3 by means of tubes 4 and 5, located at either side of the cavity plate 1, as shown in FIGURES 1 and 2. The cavity plate 1 also defines the outer surface of six molding cavities 6 which are uniformly spaced around the plate. In the center of the plate 1 is a sprue 7 adapted to receive the end of the injection nozzle B.

Figure 4:
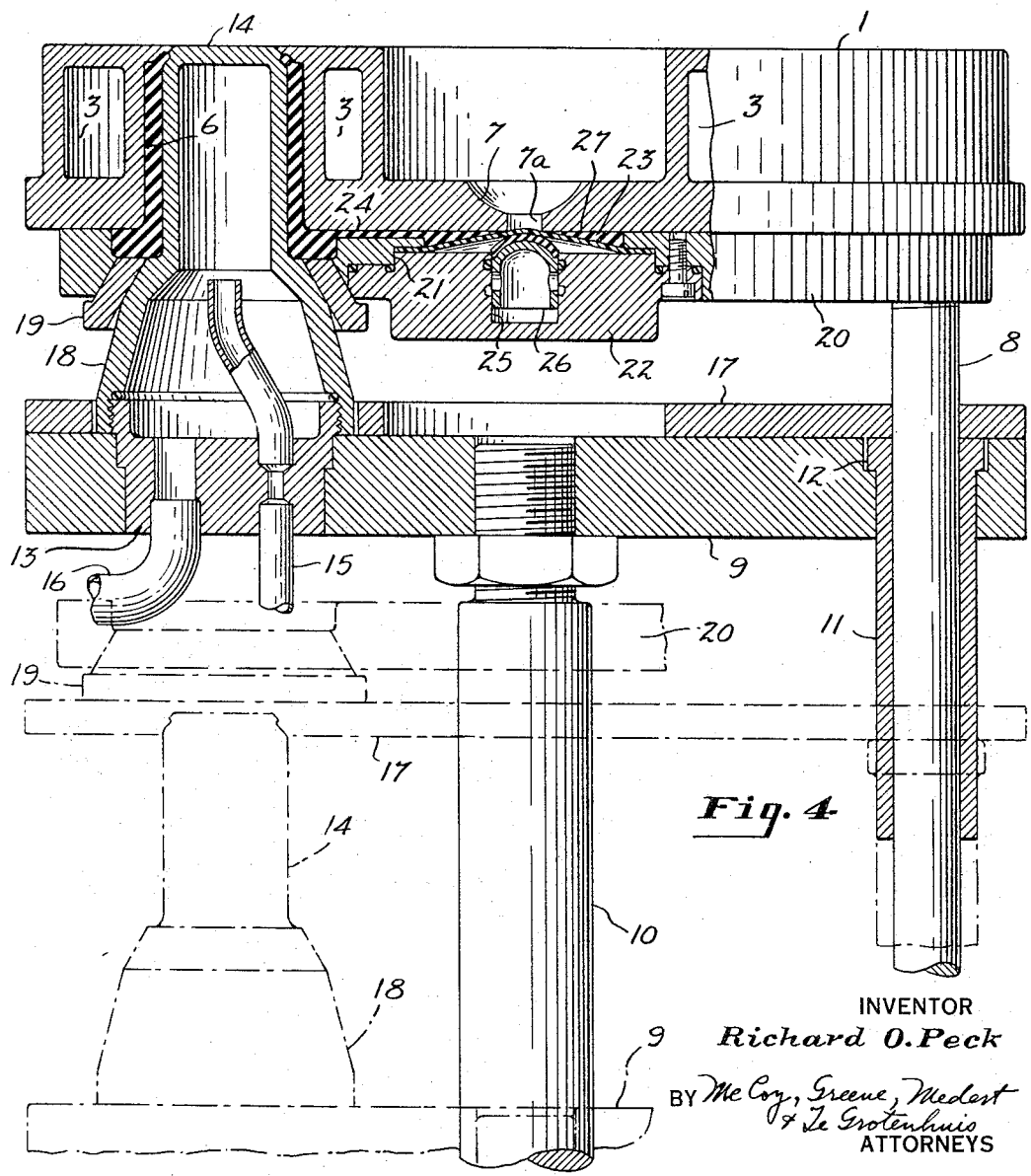
FIGURE 4 is a vertical cross-sectional view on an enlarged scale similar to FIGURE 3 with parts broken away for the purpose of illustration and showing the diaphragm in its flexed condition, the mold stripper plate and core being shown in their open position in dashed lines.

Threadedly received in the bottom of the jacketed cavity plate 1 are four guide rods 8 which serve to guide movable parts of the molding unit A during the molding operation. Mounted for reciprocating movement on the guide rods 8 is a core plate 9, as best shown in FIGURES 2 and 4. Movement of the core plate 9 is controlled by means of an operating rod 10 threadedly received at the center of the core plate 9, as shown in FIGURES 2 and 4. The rod 10 may be operated by a hydraulic cylinder or other suitable means. Located in circular bores and counter bores in the core plate 9 are four bushings 11 having flanged upper ends 12, the bushings 11 being slidably received on the guide rods 8. The downward movement of the bushings 11 is limited by stops (not shown), and the body of the core plate is adapted to slide further downward on the bushings after they reach their limiting position during the retraction of the cores.

Mounted in six circular openings in the core plate 9 are six circular core mounts 13, as best shown in FIGURE 4. A threaded portion of the core mounts 13 extends above the top surface of the core plate 9 to threadedly receive a hollow mold core 14, six of which are uniformly spaced around the core plate 9 and arranged for insertion into the molding cavities 6 to define the articles to be produced. Each of the core mounts 13 has an inlet hose 15 and an outlet hose 16 attached thereto adapted to supply steam or cooling water to the cavities to provide the necessary curing temperatures during the molding operation and cooling prior to removal of the molded articles. The steam supply and removal system is best shown in FIGURE 4. Located on the core plate 9 is stripper plate 17 which has suitable openings formed therein to permit it to fit over the projecting cores 14 and core mounts 13. The stripper plate 17 is mounted for reciprocating movement on the guide rods 8; however, its downward movement is limited by the bushings 11, as will be hereinafter described.

Figure 3:
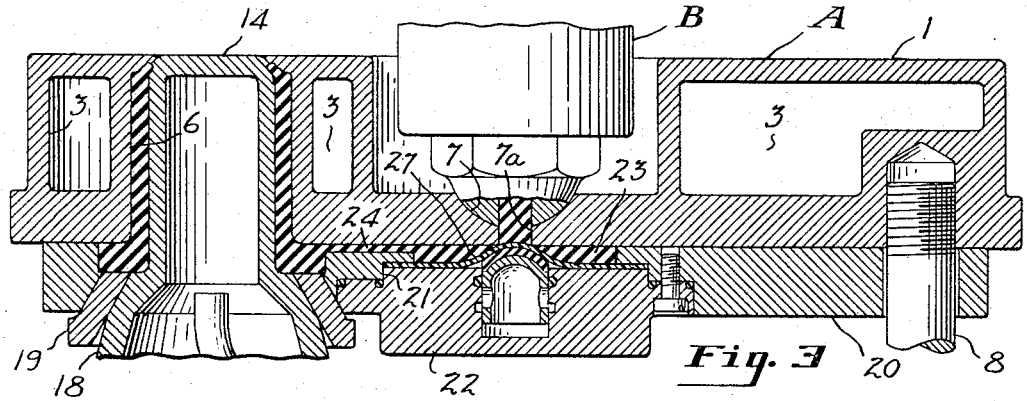
FIGURE 3 is a vertical cross-sectional view on an enlarged scale taken on the line 3—3 of FIGURE 1 and showing the check valve in its closed position.

The cores 14 are formed with an outwardly flanged conical base to provide a shoulder 18 which receives a stripper ring 19. As the cores are retracted from the mold cavities, the downward movement of the stripper rings 19 is limited by the stripper plate 17, as shown in dashed lines in FIGURE 4. Thus, the molded articles are stripped off of the cores 14 and supported on the stripper rings 19 to permit easy removal from the mold. The stripper rings 19 are also of a generally conical form and support on their outer conical surfaces a bottom plate 20 adapted for engagement with the bottom of the cavity plate 1 when the molding unit A is in its closed molding condition to define the bottom portion of the mold cavities. The bottom plate 20 has a large circular opening 21 in the middle thereof which receives a bladder plate 22 which is securely bolted to the bottom plate 20, as best shown in FIGURES 3 and 4.

The top surface of the bladder plate 22 is spaced from the bottom surface of the cavity plate 1 to provide a circular chamber 23 which communicates with the mold sprue 7. Runners 24 are formed in the top face of the bottom plate 20 to provide a conduit for passage of liquid molding material from the chamber 23 into the mold cavities 6.

Located in a circular bore 25 in the center of the bladder plate 22 is a reciprocating check valve piston 26 which is operated by pneumatic pressure, as will be hereinafter described.

Located on the top surface of the bladder plate 22 is a flexible bladder 27 which is adapted to flex within the chamber 23 between a bulged or flexed position, as shown in FIGURE 4, and an unflexed position, as shown in FIGURE 2. The bladder 27 is preferably formed of "Teflon" or other low friction and low adhesion plastic material to which cured molding material will not adhere. The peripheral edge of the bladder 27 is securely clamped between the bladder plate 22 and the bottom plate 20, and the central portion of the bladder is positioned over the reciprocating check valve piston 26. When the molding unit A is in its closed molding position, the check valve piston 26 may be moved upwardly against the bottom face of the bladder 27 to press the top face of the bladder into sealing engagement with the interior edges of the sprue orifice, as shown in FIGURE 3, thus preventing further entry of molding material into the chamber 23 or escape of fluid when the injection nozzle is removed.

The valve piston 26 is operated by pneumatic pressure which forces the piston upwardly in the circular bore 25. The pressure used to operate the check valve is greater than that used to operate the bladder 27, such as for example around 100 p.s.i. Pressurized air or other pneumatic fluid is permitted to enter the molding unit A from an air hose 28 into a passage 29 formed in the bottom plate 20 which in turn communicates with a passage 30 formed in the bladder plate 22. The passage 30 communicates with the circular bore 25 which receives the piston 26.

The flexing of the bladder 27 into the position shown in FIGURE 4 serves to force liquid molding material, located in the central chamber 23, through the runners 24 into the mold cavities 6, thus providing a high pressure on the molding material. This pressure which is relatively high, such as around 75 p.s.i., forces air out through parting lines in the mold cavities, reduces the size of air pockets and causes some dissolution of air and other gases into the molding material.

The flexing of the bladder to this position is provided for by pneumatic pressure from a second pressure source. The pressurized fluid enters through a hose 31 into a passage 32 formed in the bottom plate 20 which communicates with the chamber 23 beneath the bladder 27, as shown in FIGURE 2. The pressurized fluid forces the bladder to its flexed or inflated condition, as shown in FIGURE 4. This pneumatic pressure is preferably lower than the pressure used to operate the check valve piston 26, so that the piston will not be forced back down into the circular bore.

*Operation*

In the operation of the molding unit A, the core plate 9, stripper plate 17 and bottom plate 20 are all moved to the condition shown in FIGURE 2, so that the cores 14 are inserted in the mold cavities 6 to define a sealed space adapted to form the molding material to the desired configuration. The edges of the top faces of the cores 14 engage the top wall of the jacketed cavity plate 1 to seal the cavities from above. The mold cores 14 and the jacketed cavity plate 1 are heated to curing temperatures by means of steam which is pumped through the passages 3 and cores 14.

An injection nozzle B is then brought into engagement with the mold sprue 7, as best shown in FIGURE 2, and the molding material injected therethrough. The liquid molding material is forced into the central chamber 23, outwardly through the runners 24 and into the molding cavities 6 until the cavities are substantially full. With the cavities full and the pressures equalized, pneumatic pressure is introduced through the pneumatic hose 28 to force the valve cylinder 26 upwardly against the bladder 27 to seal the sprue orifice 7a, as shown in FIGURE 3. The injection nozzle B may then be removed if desired.

Pressure is then introduced beneath the bladder 27 through the pneumatic hose 31 to flex the bladder and force liquid molding material located in the chamber 23 outwardly through the runners 24 to insure complete filling of the cavities and reduction of air pockets, as best shown in FIGURE 4. The molding material is then allowed to cure in the mold for the desired curing period at the desired curing temperature. In the case of liquid urethane, the curing temperature is about 250° F.

When the molder article has cured, removal of the articles from the molding unit is accomplished by first pumping cooling water through the passages 3 and cores 14, and then retracting the core plate 9 using the core operating rod 10 to remove the cores 14 from the molding cavities. Normally, the molded article will remain on the cores as they are retracted. As the core plate 9 is lowered, carrying the stripper plate 17, stripper rings 19, bottom plate 20 and molded article along with it, the bottoms of the bushings 11 located on the guide rods 8 engage a stop (not shown) which prevents the stripper plate 17 from dropping any further with the core plate 9. The stripper plate 17 eventually engages the stripper rings 19 which prevent further downward movement of the molded articles with the core and thus slide the articles off the cores. The cores 14 are lowered to the position shown in dashed lines in FIGURE 4, and the stripper plate and stripper rings are held above the core plate 9, as also shown in dashed lines in FIGURE 4. The molded articles may then be easily removed from the stripper rings 19.

Prior to the next molding operation, the scrap material in the runners and the bladder slug are removed, and the mold cleaned with high pressure air to remove excess molding material. This technique provides a flashless molded article in which air pockets have been eliminated or substantially reduced.

It is to be understood that in accordance with the provisions of the patent statutes, variations and modifications of the specific device herein shown and described may be made without departing from the spirit of the invention.

Having thus described my invention, what I claim is:

1. In a molding unit for injection molding with liquid plastics, a sprue adapted to receive molded liquid from an injection nozzle, means defining a chamber communicating with said sprue and with at least one mold cavity, a flexible bladder mounted in said chamber, a check valve piston cooperating with said bladder and mounted for reciprocating movement perpendicular to said bladder to force said bladder into sealing engagement with said sprue to prevent escape of molding liquid from said chamber, means for operating said check valve piston, and fluid pressure means operable to flex said bladder in said chamber to pressurize molding liquid in said molding unit.

2. A molding unit as defined in claim 1 wherein said means for operating said check valve piston comprises a pneumatic pressure system.

3. A molding unit as defined in claim 1 wherein said bladder is formed of a fluorocarbon resin.

4. A molding unit as defined in claim 3 wherein said fluorocarbon is polytetrafluoroethylene.

5. A molding unit for injection molding with liquid plastics comprising:
   (a) a mold defining at least on mold cavity,
   (b) a sprue adapted to receive molding liquid from an injection nozzle,
   (c) means defining a chamber communicating with said sprue and with each mold cavity,
   (d) a flexible bladder mounted in said chamber, said bladder being formed of a low-adhesion plastic,
   (e) a check valve piston cooperating with said bladder and mounted for reciprocating movement perpendicular to said bladder to force said bladdder into sealing engagement with said sprue to prevent entry or escape of molding liquid from said chamber,
   (f) high pneumatic pressure means for operating said check valve piston, and
   (g) low pneumatic pressure means operable to flex said bladder in said chamber to pressurize molding liquid in said mold.

6. A molding unit as defined in claim 5 wherein said bladder is of a flat circular form peripherally mounted in said chamber.

7. A molding unit as defined in claim 6 wherein said bladder is formed of polytetrafluoroethylene.

References Cited

UNITED STATES PATENTS

| | | | |
|---|---|---|---|
| 2,476,550 | 7/1949 | Jobst | 18—30 |
| 2,698,460 | 1/1955 | Amo | 18—30 X |
| 2,885,180 | 5/1959 | Zinkil | 251—331 |
| 3,070,344 | 12/1962 | Tausch | 251—331 X |

J. SPENCER OVERHOLSER, *Primary Examiner.*

WILBUR L. McBAY, *Examiner.*

UNITED STATES PATENT OFFICE
CERTIFICATE OF CORRECTION

Patent No. 3,339,239                    September 5, 1967

Richard O. Peck

It is hereby certified that error appears in the above numbered patent requiring correction and that the said Letters Patent should read as corrected below.

Column 5, line 6, for "molded" read -- molding --; line 26, for "on" read -- one --.

Signed and sealed this 20th day of August 1968.

(SEAL)
Attest:

Edward M. Fletcher, Jr.                        EDWARD J. BRENNER
Attesting Officer                                Commissioner of Patents